E. F. BREDEHOFT.
INDEX FOR LOOSE LEAF LEDGERS.
APPLICATION FILED OCT. 21, 1908.
1,100,285.
Patented June 16, 1914.
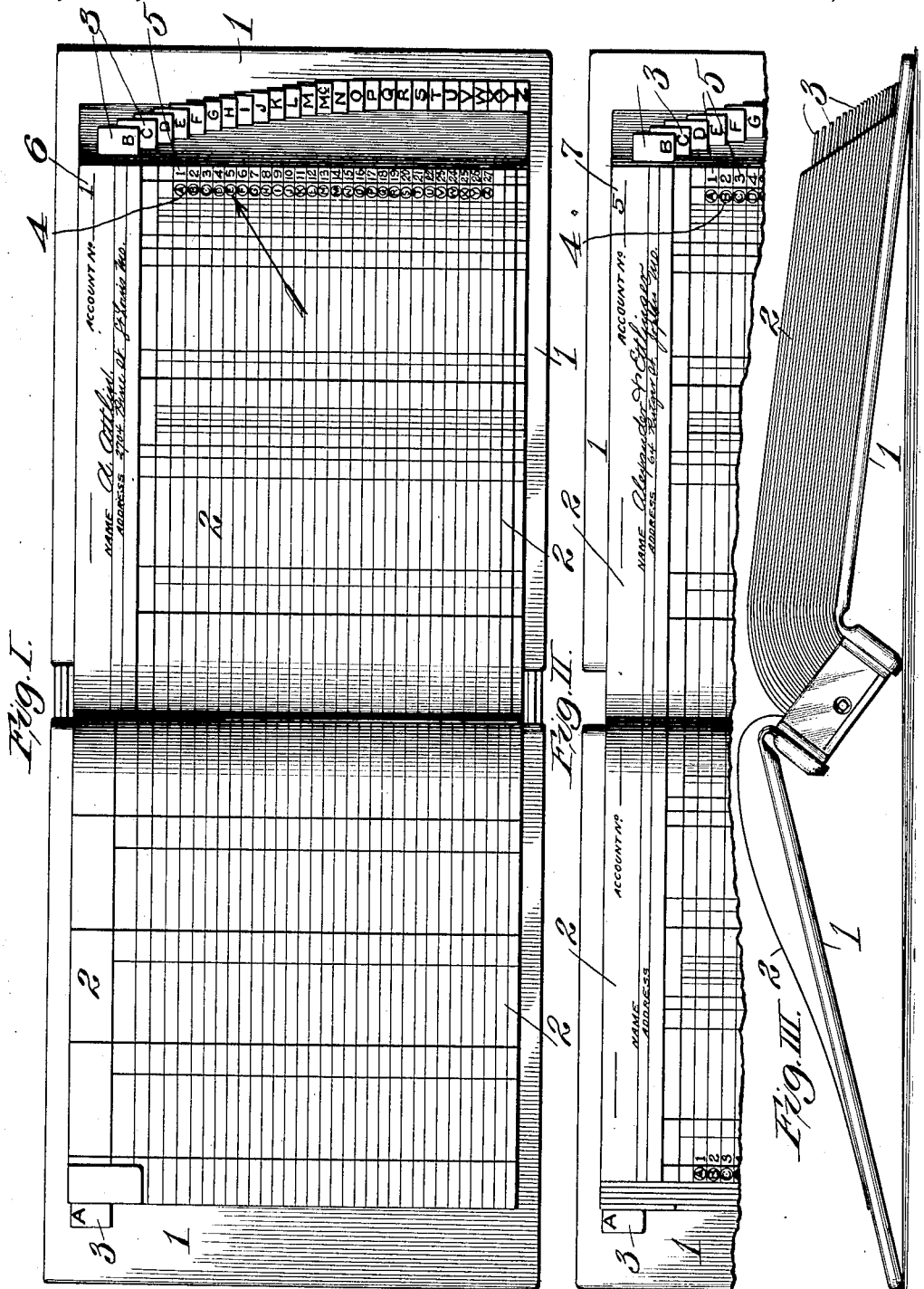

UNITED STATES PATENT OFFICE.

EDWARD F. BREDEHOFT, OF ST. LOUIS, MISSOURI.

INDEX FOR LOOSE-LEAF LEDGERS.

1,100,285.

Specification of Letters Patent. Patented June 16, 1914.

Application filed October 21, 1908. Serial No. 458,882.

*To all whom it may concern:*

Be it known that I, EDWARD F. BREDEHOFT, a citizen of the United States of America, residing in the city of St. Louis and State of Missouri, have invented certain new and useful Improvements in Indexes for Loose-Leaf Ledgers, of which the following is a full, clear, and exact description, reference being had to the accompanying drawings, forming part of this specification.

My invention relates to an index for loose leaf ledgers, and it has for its object the production of a main index whereby a loose leaf ledger is divided into alphabetical divisions each having a number of leaves, and a secondary or supplemental key index on the vertical edge of each divisional leaf to be used in connection with said main index to speedily locate any account, under its proper alphabetical division letter, that may have been entered in the book, or to speedily determine the page or account number of a loose leaf ledger sheet, to be contained within the loose leaf ledger, and having an account inscribed thereon, so that said page or account number may be ascertained by the use of my supplemental key index, to the end that said loose leaf ledger sheet may be inserted in the loose leaf ledger in its numerical order, under its proper alphabetical division of the ledger. Primarily, the initial letter of the corporate, firm, or surname determines in which alphabetical division of the loose leaf ledger the loose leaf ledger sheet having an account inscribed thereon will be entered; and, secondarily, the page or account number of said loose leaf ledger sheet is determined by selecting one or more key letters from the name of the account inscribed on said loose leaf ledger sheet, which, upon reference to the supplemental key index, will give the numerals, (originally arbitrarily selected for the supplemental index), of such letters so selected, singly, or consecutively combined, which number is then entered in a space provided for this purpose upon said sheet; after which said sheet is ready for insertion in numerical order in the loose leaf ledger under the proper alphabetical division.

I preferably provide each of the loose leaf ledger sheets with my supplemental key index printed near the side edge, so that it is handy for immediate reference when the loose leaf ledger is being used. When the user has made an entry in or examined an account in the loose leaf ledger before examining another account, it is only necessary for him to refer to the sheet upon which he has made an entry, or has just examined, in order that he may ascertain the page or account number of the next account which he desires to examine, which will be found under its proper alphabetical division letter in numerical order with the page or account number thereon which the user has ascertained upon reference to the supplemental key index. It is of course apparent that this supplemental key index could be reproduced upon some visible portion of the loose leaf ledger, where it would be handy for reference by the user of the ledger.

Figure I is a face view of a loose leaf ledger, containing loose leaf ledger sheets, with my supplemental key index printed thereon, in open position to afford a view of one account. Fig. II is a face view of the upper portion of the loose leaf ledger in open position, and with an account different from the account shown in Fig. I exposed to view. Fig. III is an end elevation of a loose leaf ledger containing loose leaf ledger sheets, the book being of loose leaf type, and being shown in open position.

In the accompanying drawings: 1 designates the covers of a loose leaf ledger, and 2 the loose leaf ledger sheets between the covers. The ledger is of loose leaf type of any desired construction wherein additional leaves may be inserted from time to time to meet requirements according to the accounts to be kept therein. The loose leaf ledger is divided into alphabetical divisions in which all of the loose leaf ledger sheets are account sheets and which are provided with suitable spaces upon which names of parties for whom accounts are to be kept may be entered, and the number of sheets in each division is equal to or greater than the number of letters in the alphabet. Suitable letter tabs 3 are applied to the loose leaf ledger sheets of the ledger at intervals to divide it into main alphabetical divisions.

In my preferred construction, at some suitable point upon each sheet, as for instance at the margin of each sheet, is a single row of alphabetical characters, as indicated at 4, which constitute a portion of the supplemental key index, and opposite to these alphabetical characters and complementary thereto, constituting the remainder of the supplemental key index, is a row of arbitrarily selected numerals, which are indicated at 5.

In indexing a loose leaf ledger sheet in accordance with my plan, the account is inscribed upon said sheet in a space provided for that purpose at the top of the sheet. The initial letter of the corporate, firm, or surname determines the alphabetical division under which this sheet will be filed primarily. Thus, for instance, if the initial of the surname of the party, (if the account be for an individual), is the letter "A," this indicates that this sheet will be entered in the loose leaf ledger under the division marked by the tab "A." Any one or more letters of this name may be selected as a key letter, or key letters, for the purpose of determining by the use of my supplemental key index the number to be inscribed upon said sheet. For instance, if the first initial to view in the name of the account be selected, which is "A" in Fig. I, the user, upon reference to the supplemental key index finds that the numeral complementary to the letter "A" in such supplemental key index is 1, and this numeral is, therefore, inserted in its proper position, (as indicated at 6, Fig. I), which determines the numerical order in which this sheet will be placed in the loose leaf ledger under the alphabetical division letter "A." If the account be that of a firm, as appears in Fig. II, the initial letter of the first name "Alexander" would determine the alphabetical division in the ledger under which the sheet bearing this account would be entered. If, instead of taking the first letter to view, which in this case would be the letter "A," the first letter of the second name be selected, being the letter "E" in the name "Etlinger," the user, upon reference to the supplemental key index would find that the arbitrary numeral complementary to the letter "E" is 5; therefore, this numeral would be inserted in its proper position upon the sheet, as indicated at 7, Fig. II, and this sheet be then placed in the ledger under the alphabetical division letter "A," in numerical order. These sheets being inserted in the ledger can each be located by a repetition of the foregoing operations whereby the sheet number is determined by the supplemental key index, as described, and the sheet with the desired account inscribed thereon found in its numerical order under its main index alphabetical division, determined as heretofore fully described.

It is obvious that by selecting two or more letters to serve as key letters, a greater number of combinations can be secured under each serial letter of the alphabet. If the first two letters to view in any name be selected as the key letters, it is possible to secure over 600 combinations under each letter of the alphabet, thus making duplication of the page number quite improbable. For instance, if it be desired to refer to the account of James Albertson, "A" would be the primary index letter under which alphabetical division the account would be found, while the first two letters to view being "J" and "a" in the name "James," constituting the key letters, would give, upon reference to the supplemental key index, a page number of 101, being the consecutively combined numerals complementary to the letters "J" and "a" in the supplemental key index. The numeral complementary to the letter "J" in the supplemental key index is "10" and the numeral complementary to the letter "a" in said index is "1," these numerals being consecutively combined give the number "101," which serves as the page or account number for the loose leaf ledger sheet having the said account inscribed thereupon. A very large number of combinations can obviously be readily secured by using the first three letters to view instead of the first two. But for all practical purposes, the first one or the first two letters to view, as herein described, are sufficient for the average size loose leaf ledgers.

I claim:

The herein described two column index for determining the exact page numbers of loose leaf account books, comprising a sheet provided with an alphabet column consisting of a row of alphabetically arranged alphabetical characters; and a numeral column consisting of a row of numerals located opposite to the alphabetical characters, the numerals being arranged in consecutive numerical order to correspond with the alphabetical order of the alphabetical characters, whereby page numbers to be written on the loose leaves of an account book may be primarily determined, before the loose leaves are inserted into the book by selecting initial letters of the title of the accounts on such leaves, and thereafter selecting, from said numeral column, the numerals located opposite the selected letters; thereby permanently fixing the page numbers and enabling the user to find the exact page number of each account by again comparing the initial letters of the accounts with the complementary numerals in the numeral column.

EDW. F. BREDEHOFT.

In presence of—
HOWARD G. COOK,
EDNA LINN.